(12) United States Patent
Weinstein et al.

(10) Patent No.: US 10,124,307 B2
(45) Date of Patent: Nov. 13, 2018

(54) VISCOUS FLUID DILUTION SYSTEM AND METHOD THEREOF

(71) Applicants: Jeremy L. Weinstein, Tomball, TX (US); Bryan Scott Lambert, The Woodlands, TX (US); Abel A. Gloria, Pinehurst, TX (US)

(72) Inventors: Jeremy L. Weinstein, Tomball, TX (US); Bryan Scott Lambert, The Woodlands, TX (US); Abel A. Gloria, Pinehurst, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 99 days.

(21) Appl. No.: 15/248,565

(22) Filed: Aug. 26, 2016

(65) Prior Publication Data
US 2016/0367955 A1 Dec. 22, 2016

Related U.S. Application Data

(62) Division of application No. 13/911,296, filed on Jun. 6, 2013, now Pat. No. 9,452,394.

(51) Int. Cl.
*B01F 3/12* (2006.01)
*B01F 15/00* (2006.01)
(Continued)

(52) U.S. Cl.
CPC ...... *B01F 15/00136* (2013.01); *B01F 3/1271* (2013.01); *B01F 15/0216* (2013.01);
(Continued)

(58) Field of Classification Search
CPC ............ B01F 15/00136; B01F 15/0216; B01F 15/0234; B01F 15/0243; B01F 15/0261; B01F 2215/0081; B01F 3/1271
See application file for complete search history.

(56) References Cited

U.S. PATENT DOCUMENTS

| | | |
|---|---|---|
| 2,534,792 A | 12/1950 | Nevins et al. |
| 3,894,084 A | 7/1975 | Werges et al. |

(Continued)

FOREIGN PATENT DOCUMENTS

| | | |
|---|---|---|
| CA | 2550988 C | 12/2008 |
| EP | 0845291 A | 6/1998 |
| WO | 2014197134 a1 | 12/2014 |

OTHER PUBLICATIONS

Bueche, F.; "Mechanical Degradation of High Polymers"; (1960) vol. IV, Issue No. 10; 6 pages.
(Continued)

*Primary Examiner* — Tony G Soohoo
(74) *Attorney, Agent, or Firm* — Cantor Colburn LLP

(57) ABSTRACT

A dilution system for a hydraulic fracturing fluid includes a dilution manifold, a hydration unit configured to provide a source of liquid, a diluent line connecting the hydration unit to the dilution manifold, a diluent flow control valve on the diluent line, a hydration tank configured to hydrate a mixed additive, a gravity-driven viscous fluid line connecting an exit of the hydration tank to the dilution manifold, a viscous fluid flow meter on the viscous fluid line, and a viscous fluid control valve on the viscous fluid line.

20 Claims, 1 Drawing Sheet

(51) Int. Cl.
*B01F 15/02* (2006.01)
*E21B 41/00* (2006.01)
*E21B 43/29* (2006.01)
*C09K 8/90* (2006.01)
*C09K 8/68* (2006.01)
*C09K 8/80* (2006.01)
*E21B 43/26* (2006.01)
*C09K 8/88* (2006.01)

(52) U.S. Cl.
CPC ...... *B01F 15/0234* (2013.01); *B01F 15/0243* (2013.01); *B01F 15/0261* (2013.01); *C09K 8/68* (2013.01); *C09K 8/685* (2013.01); *C09K 8/80* (2013.01); *C09K 8/882* (2013.01); *C09K 8/887* (2013.01); *C09K 8/90* (2013.01); *E21B 43/26* (2013.01); *B01F 2215/0081* (2013.01); *E21B 41/00* (2013.01)

(56) References Cited

U.S. PATENT DOCUMENTS

| | | | |
|---|---|---|---|
| 3,997,445 A | 12/1976 | Hannestad | |
| 4,099,005 A | 7/1978 | Fullington et al. | |
| 4,159,180 A * | 6/1979 | Cooper | B01F 13/0035 366/26 |
| 4,209,278 A * | 6/1980 | Cooper | B01F 13/0035 414/477 |
| 4,239,396 A * | 12/1980 | Arribau | B01F 5/225 366/170.3 |
| 4,305,463 A | 12/1981 | Zakiewicz | |
| 4,374,545 A * | 2/1983 | Bullen | B62B 1/18 166/177.5 |
| 4,425,227 A | 1/1984 | Smith | |
| 4,569,394 A * | 2/1986 | Sweatman | E21B 43/267 166/280.1 |
| 4,579,578 A | 4/1986 | Cooke | |
| 4,622,155 A | 11/1986 | Harris et al. | |
| 4,716,932 A * | 1/1988 | Adams, Jr. | B01F 3/1271 137/565.29 |
| 4,846,582 A * | 7/1989 | Davidsson | B01F 1/00 366/137.1 |
| 5,046,855 A * | 9/1991 | Allen | B01F 13/10 137/605 |
| 5,052,486 A * | 10/1991 | Wilson | B01F 3/0861 166/308.4 |
| 5,064,582 A | 11/1991 | Sutton et al. | |
| 5,103,908 A * | 4/1992 | Allen | B01F 3/04836 166/285 |
| 5,114,239 A * | 5/1992 | Allen | B01F 3/04836 366/136 |
| 5,190,374 A * | 3/1993 | Harms | B01F 5/205 366/165.2 |
| 5,382,411 A * | 1/1995 | Allen | B01F 3/1271 366/153.1 |
| 5,426,137 A * | 6/1995 | Allen | B01F 3/1271 366/158.4 |
| 5,558,160 A * | 9/1996 | Tudor | C09K 8/62 166/177.5 |
| 5,964,295 A | 10/1999 | Brown et al. | |
| 6,193,402 B1 * | 2/2001 | Grimland | B01F 3/1221 366/14 |
| 6,494,932 B1 | 12/2002 | Abercrombie | |
| 6,802,638 B2 | 10/2004 | Allen | |
| 6,817,376 B2 * | 11/2004 | Morgan | B01F 3/0861 137/14 |
| 7,029,165 B2 | 4/2006 | Allen | |
| 7,066,586 B2 | 6/2006 | Da Silva | |
| 7,104,328 B2 | 9/2006 | Phillippi et al. | |
| 7,284,898 B2 | 10/2007 | Duell | |
| 7,419,296 B2 * | 9/2008 | Allen | B01F 3/1221 366/164.6 |
| 7,581,872 B2 | 9/2009 | Allen | |
| 7,690,429 B2 | 4/2010 | Creel et al. | |
| 7,790,774 B1 | 9/2010 | Kinsey et al. | |
| 7,794,135 B2 | 9/2010 | El Kholy | |
| 7,810,986 B2 | 10/2010 | Landers et al. | |
| 7,866,881 B2 | 1/2011 | El Kholy et al. | |
| 7,888,294 B2 | 2/2011 | Weinstein et al. | |
| 7,913,762 B2 | 3/2011 | Wheeler et al. | |
| 7,972,998 B2 | 7/2011 | Dessinges et al. | |
| 8,043,999 B2 | 10/2011 | Sullivan et al. | |
| 8,044,000 B2 | 10/2011 | Sullivan et al. | |
| 8,141,640 B2 | 3/2012 | Abad et al. | |
| 8,162,050 B2 | 4/2012 | Roddy et al. | |
| 8,297,377 B2 | 10/2012 | Zupanick | |
| 8,347,959 B2 | 1/2013 | Suarez-Rivera et al. | |
| 8,393,390 B2 | 3/2013 | Gupta et al. | |
| 8,397,816 B2 | 3/2013 | Abad et al. | |
| 8,517,102 B2 | 8/2013 | Sullivan | |
| 8,579,028 B2 | 11/2013 | Nguyen et al. | |
| 8,641,266 B2 | 2/2014 | McIntire | |
| 8,851,179 B2 | 10/2014 | Defosse et al. | |
| 8,899,823 B2 * | 12/2014 | Oldham | C09K 8/62 366/136 |
| 8,955,430 B2 | 2/2015 | Leblanc et al. | |
| 9,022,120 B2 | 5/2015 | Zamora et al. | |
| 9,027,646 B2 | 5/2015 | Svarczkopf et al. | |
| 9,452,394 B2 * | 9/2016 | Weinstein | B01F 3/1271 |
| 9,719,340 B2 * | 8/2017 | Scharmach | E21B 43/267 |
| 9,752,389 B2 * | 9/2017 | Pham | E21B 15/00 |
| 9,790,775 B2 * | 10/2017 | Joseph | C09K 8/62 |
| 2003/0117890 A1 * | 6/2003 | Dearing | E21B 21/062 366/182.2 |
| 2003/0150494 A1 * | 8/2003 | Morgan | B01F 3/0861 137/574 |
| 2003/0196809 A1 * | 10/2003 | Willberg | C09K 8/685 166/300 |
| 2004/0008571 A1 * | 1/2004 | Coody | B01F 3/1221 366/154.1 |
| 2005/0067351 A1 | 3/2005 | Graham | |
| 2008/0264641 A1 | 10/2008 | Slabaugh et al. | |
| 2009/0323464 A1 | 12/2009 | McIntire | |
| 2010/0046316 A1 | 2/2010 | Hughes et al. | |
| 2010/0246318 A1 | 9/2010 | Kholy et al. | |
| 2011/0003720 A1 | 1/2011 | Sullivan | |
| 2011/0272155 A1 * | 11/2011 | Warren | A61L 2/10 166/275 |
| 2012/0231982 A1 | 9/2012 | Weinstein et al. | |
| 2012/0325751 A1 * | 12/2012 | Renick | E21B 43/26 210/739 |
| 2013/0142006 A1 * | 6/2013 | Saffioti | B29B 7/60 366/153.3 |
| 2014/0000899 A1 * | 1/2014 | Nevison | E21B 43/26 166/308.1 |
| 2014/0027386 A1 * | 1/2014 | Munisteri | B01D 17/0214 210/744 |
| 2014/0051610 A1 | 2/2014 | Perry et al. | |
| 2014/0364344 A1 * | 12/2014 | Weinstein | C09K 8/68 507/219 |
| 2014/0364346 A1 | 12/2014 | Weinstein et al. | |
| 2015/0060065 A1 * | 3/2015 | Scharmach | E21B 43/267 166/280.1 |
| 2015/0133348 A1 | 5/2015 | Oldham | |
| 2015/0238914 A1 * | 8/2015 | Luharuka | B01F 5/0647 366/154.1 |
| 2015/0240148 A1 * | 8/2015 | Luharuka | E21B 43/26 366/76.1 |
| 2015/0322761 A1 * | 11/2015 | Hodgson | E21B 43/267 166/308.1 |
| 2015/0345269 A1 * | 12/2015 | Kelly | E21B 21/062 166/280.1 |
| 2016/0291609 A1 * | 10/2016 | Lucas | C09K 8/62 |
| 2016/0319648 A1 * | 11/2016 | Hayworth | E21B 43/267 |
| 2017/0247958 A1 * | 8/2017 | Alfonzo Nunez | E21B 21/063 |

OTHER PUBLICATIONS

Hobbs, et al., "The mechanics of hydrothermal systems: II. Fluid mixing and chemical reactions" Ore Geology Reviews, vol. 49,

(56) References Cited

OTHER PUBLICATIONS

Dec. 2012, pp. 45-71, http://dx.doi.or/10.1016/j.oregeorev.2012.08.002.

International Search Report and the Written Opinion of the International Searching Authority; PCT/US2014/035615; dated Sep. 1, 2014; 12 pages.

Notification Concerning Transmittal of International Preliminary Report On Patentability; PCT/US2014/035623; The International Bureau of WIPO; dated Dec. 17, 2015; 6 pages.

\* cited by examiner

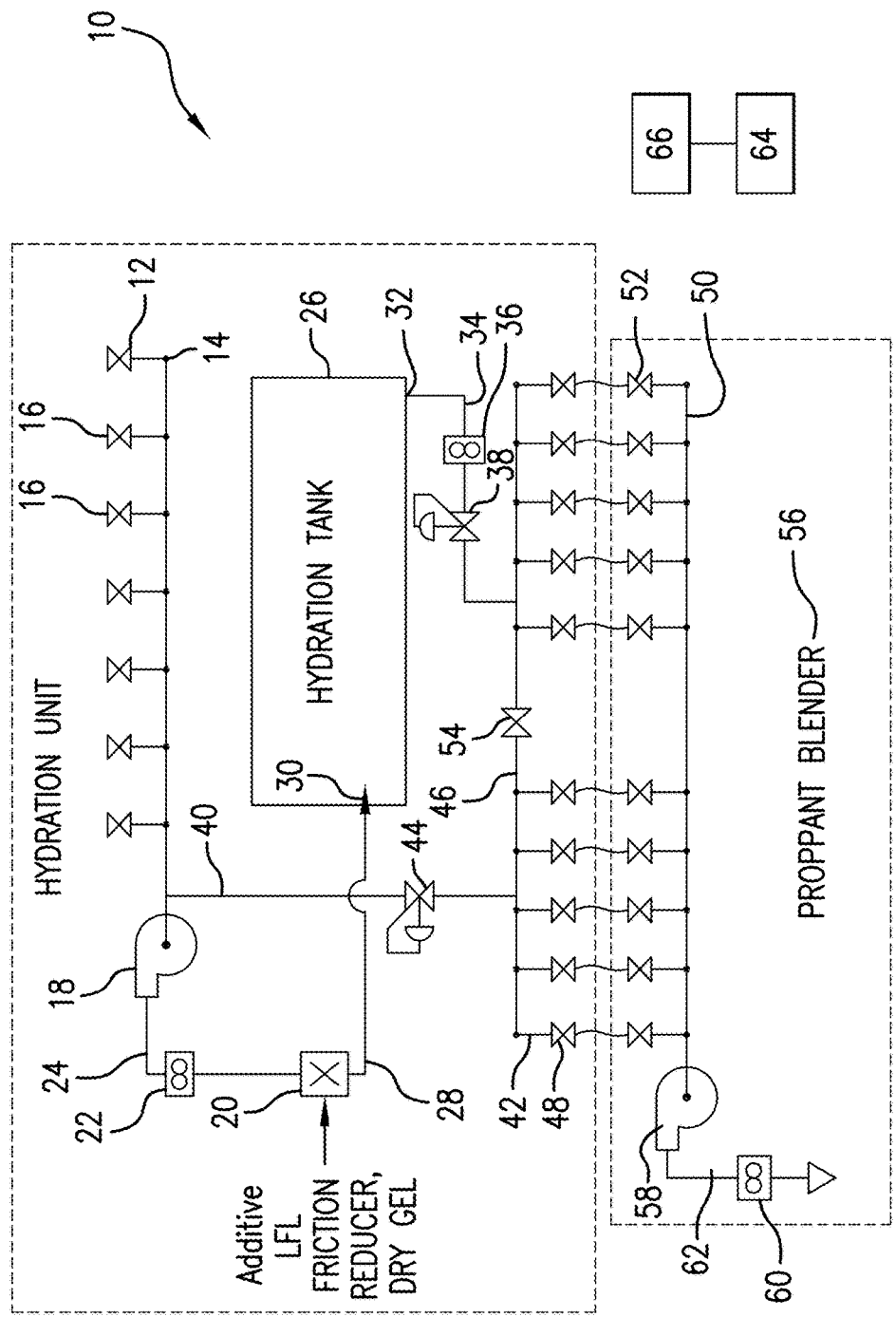

VISCOUS FLUID DILUTION SYSTEM AND METHOD THEREOF

CROSS REFERENCE TO RELATED APPLICATIONS

This application claims benefit of an earlier filing date from U.S. nonprovisional application Ser. No. 13/911, 296, filed on Jun. 6, 2013, now U.S. Pat. No. 9,452,394, the entire disclosure of which is incorporated herein by reference.

BACKGROUND

In the drilling and completion industry, the formation of boreholes for the purpose of production or injection of fluid is common. The boreholes are used for exploration or extraction of natural resources such as hydrocarbons, oil, gas, water, and alternatively for CO2 sequestration. To increase the production from a borehole, the production zone can be fractured to allow the formation fluids to flow more freely from the formation to the borehole. The fracturing operation includes pumping fluids, such as water, at high pressure and high rate towards the formation to form formation fractures. To retain the fractures in an open condition after fracturing pressure is removed, the fractures must be physically propped open, and therefore the fracturing fluids commonly include solid granular materials, such as sand, generally referred to as proppants.

In addition to proppants and water, other components of the fracturing fluid can include friction reducing additives to allow fracturing fluids and proppant to be pumped to a target zone at a higher rate and reduced pressure. The treatment design generally requires the fluid to reach maximum viscosity as it enters the fracture. The requisite viscosity is typically obtained by the gelation of viscosifying polymers and/or surfactants in the fracturing fluid. Such additives include synthetically produced and naturally occurring polymers. The selection of additives is based on a number of factors including the makeup of the formation, formation fluids, pumping configurations, and borehole temperatures. The additives can be provided as dry powders and subsequently hydrated at the fracturing site, which saves delivery costs, reduces cost of mixing slurry, and saves space by reducing a footprint required for the additives at the site.

The art would be receptive to improved apparatus and methods for processing fracturing fluid.

BRIEF DESCRIPTION

A dilution system for a hydraulic fracturing fluid, the dilution system including a dilution manifold; a hydration unit configured to provide a source of liquid; a diluent line connecting the hydration unit to the dilution manifold; a diluent flow control valve on the diluent line; a hydration tank configured to hydrate a mixed additive; a gravity-driven viscous fluid line connecting an exit of the hydration tank to the dilution manifold; a viscous fluid flow meter on the viscous fluid line; and, a viscous fluid control valve on the viscous fluid line.

A method of processing a fracturing fluid, the method including hydrating a mixed additive within a hydration tank to achieve a viscous fluid; directing the viscous fluid from the hydration tank to a dilution manifold via gravity; directing a diluent stream from a hydration unit to the dilution manifold; diluting the viscous fluid with the diluent stream; and, subsequently directing diluted viscous fluid to a blender.

BRIEF DESCRIPTION OF THE DRAWINGS

The following descriptions should not be considered limiting in any way. With reference to the accompanying drawing, like elements are numbered alike:

FIG. 1 shows a diagram of an exemplary embodiment of a viscous fluid dilution system.

DETAILED DESCRIPTION

A detailed description of one or more embodiments of the disclosed apparatus and method are presented herein by way of exemplification and not limitation with reference to the Figure.

An exemplary embodiment of a viscous fluid dilution system 10 is shown in FIG. 1, and may be incorporated on a trailer for portability or within another set up for a processing plant. A fracturing fluid, such as a friction reducer, linear gel, or another viscous proppant transporting fluid, is mixed at a rate which enables complete hydration on-board the viscous fluid dilution system 10. As will be further described below, the fracturing fluid may be mixed at a concentration higher than that required for the job design, then hydrated, and then subsequently diluted on-board the trailer of the system 10.

The additives, friction reducers, dry gels, etc. used for the fracturing fluid may be viscosifying agents such as synthetic or natural polymers. Hydratable polymers include those containing one or more functional groups, such as a hydroxyl, carboxyl, sulfate, sulfonate, amino or amido group. Preferred synthetic and natural polymers include polysaccharides, polyvinyl alcohols, polyacrylates (including the (meth)acrylates), polypyrrolidones, polyacrylamides (including (meth)acrylamides) as well as 2-acrylamido-2-methylpropane sulfonate and mixtures thereof.

Other suitable polysaccharides and derivatives are those which contain one or more monosaccharide units of galactose, fructose, mannose, glucoside, glucose, xylose, arabinose, glucuronic acid and pyranosyl sulfate. These include guar gums and derivatives thereof, locust bean gum, tara, xanthan, succinoglycan, scleroglucan and carrageenan.

Preferred viscosifying polymers may include crosslinkable polysaccharides, such as guar gums and derivatives, cellulose, starch, and galactomannan gums. Cellulose and cellulose derivatives include alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxybutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose.

Specific examples of polysaccharides useful with the present invention include, but are not limited to, guar gum, hydroxypropyl guar, carboxymethylhydroxypropyl guar and known derivatives of these gums.

Exemplary embodiments of the viscous fluid dilution system 10 include a hydration unit 12, water pump 18, flowmeter 22, mixer 20, diluent flow control valve 44, hydration tank 26, flowmeter 36, viscous fluid control valve 38, dilution manifold 42, pump 58, flowmeter 60, and proppant blender 56, details of which will be further described as follows.

The system 10 draws liquid (e.g. fresh water) to the pump 18 from the hydration unit 12. The hydration unit 12 includes an input header 14 with a plurality of hydration unit valves 16 that connect or disconnect the input header 14 from a liquid source, such as water tanks (not shown). The pump 18 pressurizes the liquid to the mixer 20. The flowmeter 22 measures the liquid flow from the pump 18 to the mixer 20 along the line 24 to ensure a proper ratio of liquid to additive within the mixer 20. A viscosifying additive, friction reducer, dry gel, etc. is added to the mixer 20. The additives, whether natural or synthetic polymers, may be introduced to the mixer 20 as a dry powder. The mixed additive and liquid (water), hereinafter "mixed additive," is then delivered to the hydration tank 26 for hydration, such as via line 28 and into input 30 of the hydration tank 26. The mixed additive may be introduced at concentrations higher than that required for execution of a specific fracturing process. The hydration tank 26 provides the mixed additive with sufficient residence time therein to achieve the required level of hydration. The hydration tank 26 may include a number of weirs therein (not shown) which provide a tortuous path within the hydration tank 26 to hydrate the mixed additive in a continuous process and increase the residency time of the mixed additive prior to exiting the hydration tank 26. The hydration tank 26 includes an exit 32. Once the mixed additive is hydrated to a viscous fluid, the viscous fluid exits the hydration tank 26 via exit 32 to a viscous fluid line 34. Along the viscous fluid line 34 are the viscous fluid flowmeter 36 and the viscous fluid control valve 38. The viscous fluid flow meter 36 measures the flow rate of the viscous fluid in the viscous fluid line 34 and the viscous fluid control valve 38 throttles the viscous fluid flow to provide the precise amount of viscous fluid required by job parameters. A diluent line 40, from the hydration unit 12 to the dilution manifold 42, directs a stream of diluent (water) to the dilution manifold 42. The diluent line 40 is separate from the lines 24, 28. The diluent flow control valve 44 is throttled to introduce diluent (water) to the dilution manifold 42. The viscous fluid line 34 sends the proper amount of viscous fluid to the dilution manifold 42 so as to be diluted with diluent from the dilution line 40 via the viscous fluid flow meter 36, viscous fluid control valve 38, and diluent flow control valve 44.

The dilution manifold 42 may include a dilution manifold header 46 and a plurality of valves 48 that prevent or allow flow from the dilution manifold 42 to a blender header 50 which may also include a number of valves 52 that prevent or allow flow from the dilution manifold to the blender header 50. An additional valve 54 is provided on the dilution manifold header 46 to separate the hydration line 40 from the viscous fluid line 34 as necessary. The diluted viscous fluid within the dilution manifold 42 having the proper ratio of additive to diluent flows into the blender header 50 and is subsequently pumped to the blender 56 using the pump 58. The flowmeter 60 monitors the flow of the diluted viscous fluid in the line 62 between the pump 58 and the blender 56 and can be used to determine if the ratio between additive and water is correct. Thus, by using only two control valves 38, 44 and flow meter 36, the viscous fluid dilution system 10 is configured to ratio the viscous fluid with the diluent. The control valves 38, 44 are configured to adjust the available net positive suction head from the two reservoirs (the hydration unit 12 and the hydration tank 26) to achieve the proper fluid ratio. While an additional flow meter (not shown) may be utilized on the diluent line 40, such as between the diluent flow control valve 44 and the hydration unit 12, such an additional flow meter would be redundant because flowmeter 60 at the blender 56 will determine if the proper ratio is being established between the water and the viscous fluid from the hydration tank 26. That is, it is not necessary to measure the rate of the diluent stream because only a single flow component and the total rate need to be measured. In the illustrated embodiment, the single flow component is the flow of viscous fluid in the viscous fluid line 34, and the total rate is the flow rate of the diluted viscous fluid sent to the blender 56 via line 62.

A power source 64 and control system 66 may be further incorporated into the viscous fluid dilution system 10. The control system 66 may be used to automate certain procedures within a method of diluting a concentrated viscous fluid and to operate certain control elements, such as the valves 38, 44, and monitor certain monitoring elements, such as the flow meters 34, 60. The control system 66 may be managed or operated by an operator or configured for automated control, or both. For example, an operator may enter the particular ratio of additive to water required for a fracturing fluid to be added to a proppant blender 56, and the control system 66 may then automatically monitor the flow meter 36 and flow meter 60 and throttle the control valves 36 and 44 as necessary to achieve the correct ratio of additive to water within the dilution manifold 42. The control system 66 may further be employed to operate and/or monitor other features of the dilution system 10 including, but not limited to, the pumps 18, 58, mixer 20, flow meter 22, valves 16, 48, 52, 54, and blender 56, although these elements may also be controlled and/or monitored by an operator as well.

In operation, a concentrated fluid is mixed by the mixer 20 and directed to the hydration tank 26. The hydration tank 26 hydrates the concentrated fluid to provide a viscous fluid to the viscous fluid line 34, which is metered using the control valve 38 and flowmeter 36. By example only, a heavy gel 40 lb/1000 gal can be mixed into the hydration tank 26 at 60 bbl/min. The heavy gel can be subsequently diluted to 24 lb/1000 gal at 100 bbl/min at the blender 56. The extra 40 bbl/min flows through the diluent line 40, which serves as a clean water crossover.

As can be readily understood from a review of FIG. 1, the viscous fluid exiting the hydration tank 26 is not pumped to the dilution manifold 42 or blender header 50 and an additional pump is not required to meter the viscous fluid. Instead, the viscous fluid is directed to the dilution manifold 42 to be subsequently diluted by the added diluent (water) from diluent line 40 solely by gravity. That is, energy for the movement of the viscous fluid, as well as the diluent, would be solely dependent upon gravity. The absence of a pump eliminates the cost of a pump as well as the footprint required by a pump. Moreover, the elimination of a pump enables the use of shear sensitive polymers within the viscous fluid dilution system 10, such as but not limited to polyacrylamides (a polymer formed from acrylamide sub units), copolymers of acrylamides, and terpolymers of acrylamides, that would otherwise be damaged and/or deleteriously affected by shear from a pump. The pumpless viscous fluid line has a shear of approximately 200 (l/s) or less from the hydration tank 26 to the dilution manifold 42 (less than a lower limit of shear in a centrifugal pump) such that the viscous fluid dilution system 10 is capable of processing such shear sensitive polymers.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A dilution system for a hydraulic fracturing fluid, the dilution system comprising:
   a dilution manifold;
   a hydration unit configured to provide a source of liquid;
   a diluent line connecting the hydration unit to the dilution manifold, and the diluent line from the hydration unit to the dilution manifold is gravity-driven and pumpless;
   a diluent flow control valve on the diluent line;
   a hydration tank configured to hydrate a mixed additive;
   a gravity-driven viscous fluid line connecting an exit of the hydration tank to the dilution manifold;
   a viscous fluid flow meter on the viscous fluid line; and,
   a viscous fluid control valve on the viscous fluid line.

2. The dilution system of claim 1, wherein the dilution system is configured to process shear sensitive polymers including polyacrylamides, copolymers of acrylamides, and terpolymers of acrylamides.

3. The dilution system of claim 1, wherein the viscous fluid line is pumpless from the hydration tank to the dilution manifold.

4. The dilution system of claim 1, wherein a ratio of diluent to viscous fluid delivered to the dilution manifold is managed by the viscous fluid flow meter, the viscous fluid control valve, and the diluent flow control valve.

5. The dilution system of claim 4, wherein the diluent line is meterless.

6. The dilution system of claim 1, further comprising a mixer configured between the hydration unit and the hydration tank, and a hydration line connecting the hydration unit to the mixer, wherein the hydration line is separate from the diluent line.

7. The dilution system of claim 6, wherein the hydration tank is configured to enable a continuous processing of a mixed additive from the mixer, and a hydrated mixed additive is a viscous fluid as it passes through the exit of the hydration tank to the viscous fluid line.

8. The dilution system of claim 6, further comprising a pump directing the liquid from the hydration unit to the mixer on the hydration line.

9. The dilution system of claim 8, further comprising a flow meter on the hydration line.

10. The dilution system of claim 1, wherein the dilution manifold is fluidically connected to a blender header of a proppant blender, and a pump directs diluted viscous fluid from the dilution manifold to the proppant blender.

11. The dilution system of claim 10, further comprising a blender line flow meter configured to measure flow from the dilution manifold to the proppant blender.

12. The dilution system of claim 10, further comprising a plurality of valves connecting the dilution manifold to the blender header.

13. The dilution system of claim 1, wherein the dilution manifold includes a dilution manifold header and a dilution manifold header valve, the dilution manifold header valve configured to separate the diluent line from the viscous fluid line at the dilution manifold header.

14. The dilution system of claim 1, wherein the diluent line is not connected to the hydration tank.

15. The dilution system of claim 1, further comprising a mixer configured to direct the mixed additive to an input of the hydration tank through a mixed additive line, wherein the diluent line is not connected to the mixed additive line.

16. The dilution system of claim 1, wherein the hydration tank is configured to increase a residency time of the mixed additive delivered to the hydration tank at an input of the hydration tank before releasing a viscous fluid at the exit of the hydration tank.

17. The dilution system of claim 1, wherein the diluent line is meterless.

18. A dilution system for a hydraulic fracturing fluid, the dilution system comprising:
   a dilution manifold;
   a hydration unit configured to provide a source of liquid;
   a diluent line connecting the hydration unit to the dilution manifold, and the diluent line is meterless;
   a diluent flow control valve on the diluent line;
   a hydration tank configured to hydrate a mixed additive;
   a gravity-driven viscous fluid line connecting an exit of the hydration tank to the dilution manifold;
   a viscous fluid flow meter on the viscous fluid line;
   a viscous fluid control valve on the viscous fluid line; and
   a blender line flow meter configured to measure flow from the dilution manifold to a proppant blender;
   wherein a ratio of diluent to viscous fluid delivered to the dilution manifold is managed by the viscous fluid flow meter, the viscous fluid control valve, and the diluent flow control valve.

19. A dilution system for a hydraulic fracturing fluid, the dilution system comprising:
   a dilution manifold;
   a hydration unit configured to provide a source of liquid, the hydration unit includes an input header and a plurality of hydration unit valves configured to connect or disconnect the input header from the source of liquid;
   a diluent line connecting the hydration unit to the dilution manifold;
   a diluent flow control valve on the diluent line;
   a hydration tank configured to hydrate a mixed additive;
   a gravity-driven viscous fluid line connecting an exit of the hydration tank to the dilution manifold;
   a viscous fluid flow meter on the viscous fluid line; and,
   a viscous fluid control valve on the viscous fluid line.

20. The dilution system of claim 19, wherein the diluent line from the hydration unit to the dilution manifold is gravity-driven and pumpless.

* * * * *